(12) United States Patent
Kobayashi et al.

(10) Patent No.: US 12,479,166 B2
(45) Date of Patent: Nov. 25, 2025

(54) RESIN PROFILE JOINING METHOD AND RESIN PROFILE JOINING DEVICE

(71) Applicant: YKK AP Inc., Tokyo (JP)

(72) Inventors: Isao Kobayashi, Tokyo (JP); Koji Matsuda, Tokyo (JP)

(73) Assignee: YKK AP Inc., Tokyo (JP)

( * ) Notice: Subject to any disclaimer, the term of this patent is extended or adjusted under 35 U.S.C. 154(b) by 196 days.

(21) Appl. No.: 18/204,980

(22) Filed: Jun. 2, 2023

(65) Prior Publication Data

US 2024/0131804 A1 Apr. 25, 2024
US 2024/0227314 A9 Jul. 11, 2024

(30) Foreign Application Priority Data

Oct. 24, 2022 (JP) ................. 2022-169621

(51) Int. Cl.
*B29C 65/70* (2006.01)
*B29C 65/00* (2006.01)
*B29C 65/78* (2006.01)

(52) U.S. Cl.
CPC .......... *B29C 65/70* (2013.01); *B29C 65/7841* (2013.01); *B29C 66/52431* (2013.01)

(58) Field of Classification Search
CPC . B29C 65/70; B29C 65/7841; B29C 65/1467; B29C 66/52431; B29C 66/324; B29C 66/1162; B29L 2031/055
See application file for complete search history.

(56) References Cited

U.S. PATENT DOCUMENTS

2007/0181654 A1* 8/2007 Knapp ................ B29C 66/5221
228/234.1
2020/0122408 A1* 4/2020 Greller .............. B29C 66/73921

FOREIGN PATENT DOCUMENTS

JP 5473667 4/2014

* cited by examiner

*Primary Examiner* — Daniel McNally
(74) *Attorney, Agent, or Firm* — Amin, Turocy & Watson, LLP

(57) ABSTRACT

Provided is a resin profile joining method of joining a pair of resin profiles. The method includes: holding one resin profile and another resin profile of the pair of resin profiles with a first mold and a second mold, respectively; heating the end surfaces of the pair of resin profiles in no contact with the end surfaces of the pair of resin profiles to melt the pair of resin profiles; after the heating, moving each of the first mold and the second mold relative to the pair of resin profiles in a longitudinal direction of a corresponding resin profile of the pair of resin profiles; and crimping the end surfaces of the pair of resin profiles to each other while keeping the first mold and the second mold in contact with the surfaces of the pair of resin profiles.

6 Claims, 9 Drawing Sheets

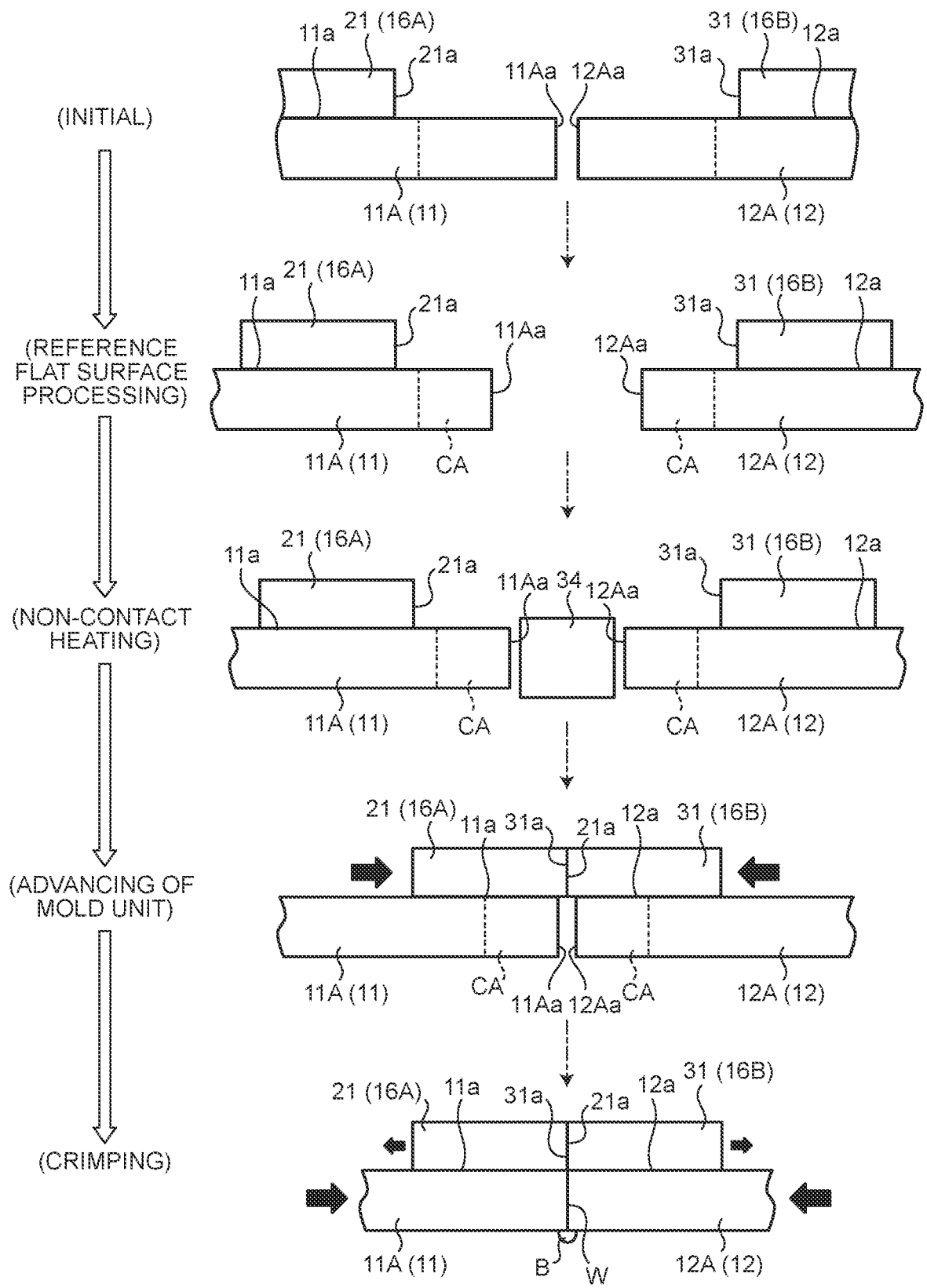

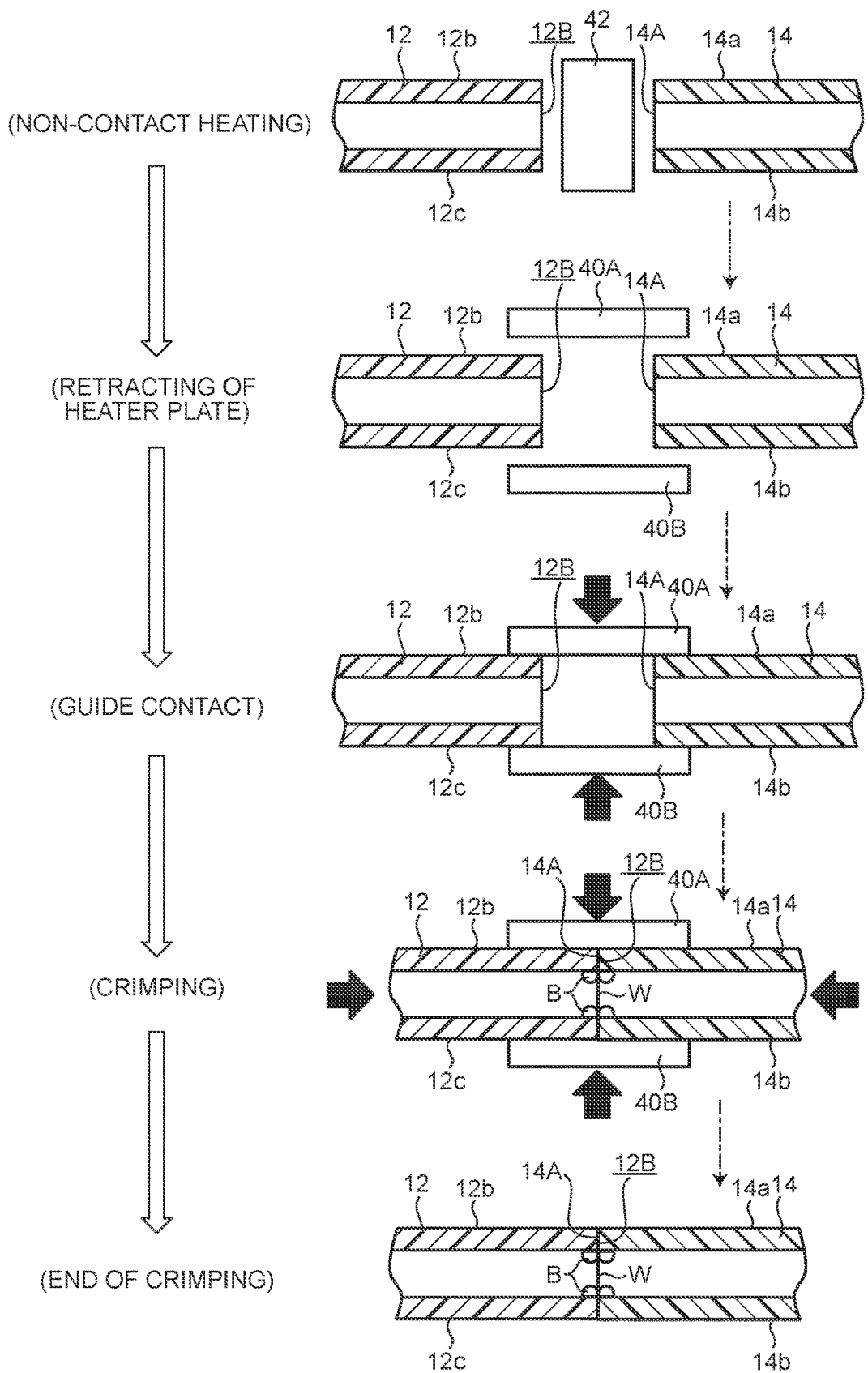

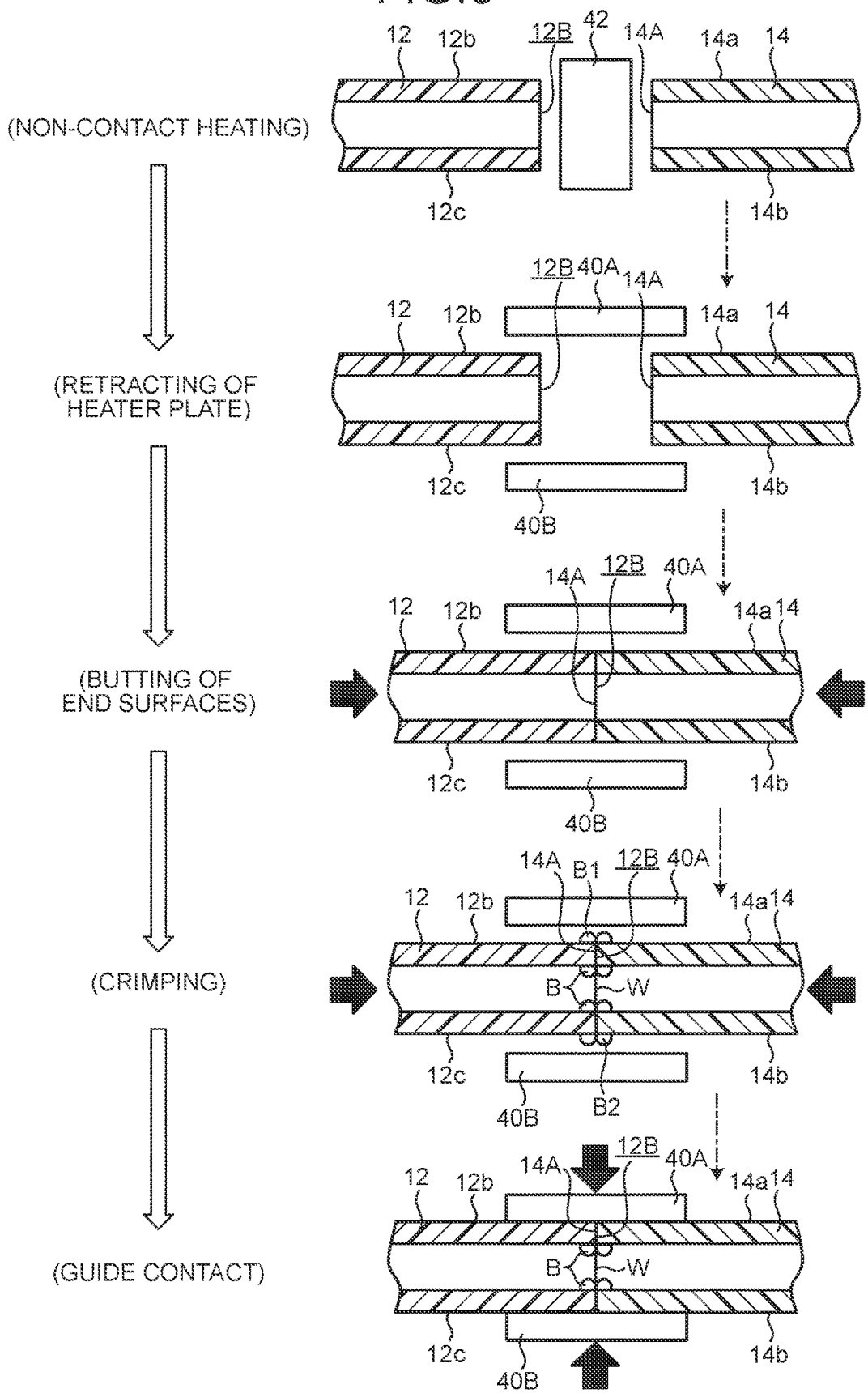

RESIN PROFILE JOINING METHOD AND RESIN PROFILE JOINING DEVICE

CROSS-REFERENCE TO RELATED APPLICATION(S)

The present application claims priority to and incorporates by reference the entire contents of Japanese Patent Application No. 2022-169621 filed in Japan on Oct. 24, 2022.

BACKGROUND OF THE INVENTION

The present disclosure relates to a resin profile joining method and a resin profile joining device, which are for joining resin profiles to each other.

An opening frame and a housing of a sash supported by the opening frame, which are used as fittings, may be formed by a resin frame with resin profiles joined together from the viewpoint of improving heat insulation performance, etc. One resin profile joining method is to set a heater plate on each end surface of a pair of resin profiles to heat and melt the resin profiles, retract the heater plate, and then crimp the resin profiles so as to join them (see, for example, Japanese Patent No. 5473667).

SUMMARY OF THE INVENTION

In the joining method described above, molten resin protrudes to a surface of the joining part between the resin profiles to form burrs, and the treatment for these burrs is problematic.

In the method according to Japanese Patent No. 5473667, a pair of cutter blades are advanced along with the resin profiles to be fusion-bonded to cut the burrs. However, in joining profiles in different forms with a complex cross-sectional shape, such as resin profiles that form the fittings, it is difficult to completely remove the burrs because of the complex steps on a surface of the profile. In view of the above, such resin profiles usually require manual post-processing, which has resulted in low productivity. This method also requires cleaning up the cutter waste to be generated, which further reduces the productivity. In addition, this method also causes a white streaky shear surface on the resin profile when the burr is torn off with a cutter blade, resulting in a deterioration of the appearance quality.

In that regard, it is desirable to provide a resin profile joining method and a resin profile joining device capable of improving the productivity and the appearance quality.

In some embodiments, provided is a resin profile joining method of joining a pair of resin profiles. The method includes: holding one resin profile and another resin profile of the pair of resin profiles with a first mold and a second mold, respectively, such that end surfaces of the pair of resin profiles are faced each other; heating the end surfaces of the pair of resin profiles in no contact with the end surfaces of the pair of resin profiles to melt the pair of resin profiles; after the heating, moving each of the first mold and the second mold relative to the pair of resin profiles in a longitudinal direction of a corresponding resin profile of the pair of resin profiles, thereby making the first mold and the second mold in contact with each other while covering between the end surfaces of the pair of resin profiles; and crimping the end surfaces of the pair of resin profiles to each other while keeping the first mold and the second mold in contact with the surfaces of the pair of resin profiles, thereby joining the pair of resin profiles.

In some embodiments, provided is a resin profile joining device that joins a pair of resin profiles. The device includes: a first mold configured to hold one resin profile of the pair of resin profiles in a state of being able to relatively move along a longitudinal direction of the one resin profile; a second mold configured to hold another resin profile of the pair of resin profiles in a state of being able to relatively move along a longitudinal direction of the other resin profile; a first base configured to support the first mold in a manner of being able to move along the longitudinal direction of the one resin profile and move the one resin profile in a state where a position of first base relative to the one resin profile is fixed; and a second base configured to support the second mold in a manner of being able to move along the longitudinal direction of the other resin profile and move the other resin profile in a state where a position of the second base relative to the other resin profile is fixed.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 4 is an operation view illustrating one procedure of the resin profile joining method at a corner part of the resin frame illustrated in FIG. 2;

FIG. 6 is an operation view illustrating a first procedure of the resin profile joining method at the mullion part of the resin frame illustrated in FIG. 2;

FIG. 8 is an operation view illustrating a third procedure of the resin profile joining method at the mullion part of the resin frame illustrated in FIG. 2.

DETAILED DESCRIPTION

Preferred embodiments of a resin profile joining method and a resin profile joining device according to the disclosure will be described in detail with reference to the accompanying drawings.

Figure 1:
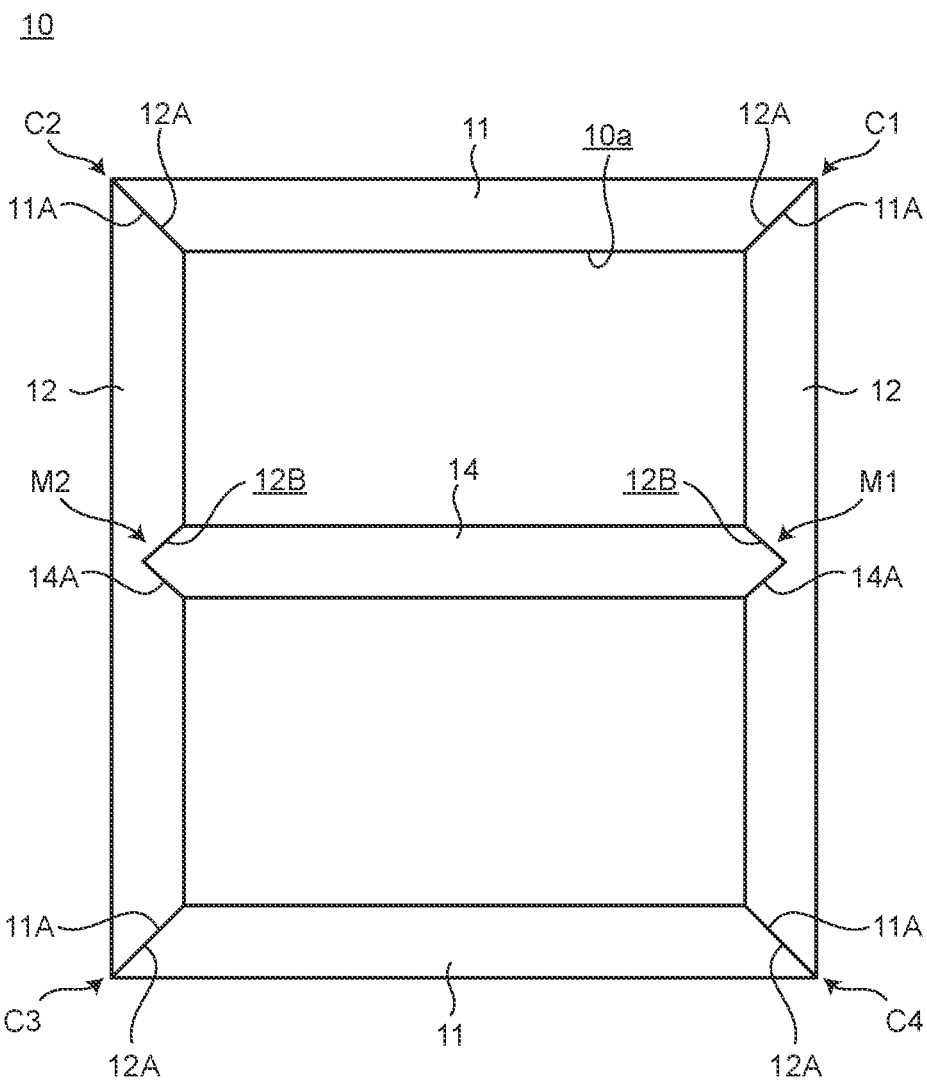
FIG. 1 is a schematic elevation view of a resin frame manufactured by a resin profile joining method according to one embodiment.

As illustrated in FIG. 1, a resin profile joining method and a resin profile joining device according to the present embodiment are method and device capable of manufacturing a resin frame 10. The resin frame 10 includes a pair of upper and lower horizontal frames 11, 11 and a pair of left and right vertical frames 12, 12 that are assembled into a rectangular shape, and a mullion 14 disposed horizontally and connected between the left and right vertical frames 12, 12.

The resin frame 10 can be used for, for example, an opening frame that supports a sash and a housing of the sash. When used for the opening frame, the resin frame 10 is fixed to an opening part of a building frame, and a sash is supported by an inner opening part 10a in an openable or non-openable manner. When used for the housing, the resin frame 10 holds a face material such as a glass plate in the opening part 10a and is supported inside the opening frame fixed to the opening part of the building frame in either an openable or non-openable manner. The opening frame and the housing formed using the resin frame 10 can be used for various types of fittings, for example, sliding windows such as a double sliding window and a single sliding window, openable windows such as a projected window and a vertically projected sliding window, a double-hung window, and a fixed window. The mullion 14 may be omitted or installed vertically between the upper and lower horizontal frames 11, 11, depending on the use of the resin frame 10 and other factors. Two or more mullions 14 may be disposed in parallel to each other.

Regarding the resin frame 10, hereinafter, a left-right direction along a longitudinal direction of the horizontal frame 11 is referred to as an X direction, an up-down direction along a longitudinal direction of the vertical frame 12 is referred to as a Y direction, and a depth direction orthogonal to the X direction and the Y direction is referred to as a Z direction. In the use as the fitting, the Z direction of the resin frame 10 corresponds to an indoor-outdoor direction.

Each of the frames 11, 12, and the mullion 14 that form the resin frame 10 is a resin profile formed by extrusion of a resin material such as polyvinyl chloride resin (PVC). Each of the frames 11, 12 is a profile having the same cross-sectional shape with each end part 11A, 12A cut at 45 degrees at a predetermined length. The end parts 11A, 12A of the respective frames 11, 12 are joined to each other in a manner that the 45-degree cut end parts 11A, 12A of the adjacent frames 11, 12 are butted and fusion-bonded together. The mullion 14 is a profile having a tapered cross-sectional shape with each end part 14A cut into a substantially right-angled triangle at a predetermined length. The mullion 14 has its end part 14A butted and fusion-bonded to a concave part 12B, which is an intermediate part of the vertical frame 12 that is cut into a substantially right-angled triangle; thus, the mullion 14 and the vertical frame 12 are joined to each other. The angle of inclination of the end parts 11A, 12A of the respective frames 11, 12 may be other than 45 degrees, and the shape of the end part 14A of the mullion 14 may be other than the triangle.

First, the joining method for the horizontal frame 11 and the vertical frame 12 and a joining device 16 capable of performing this joining method will be described.

Figure 2:
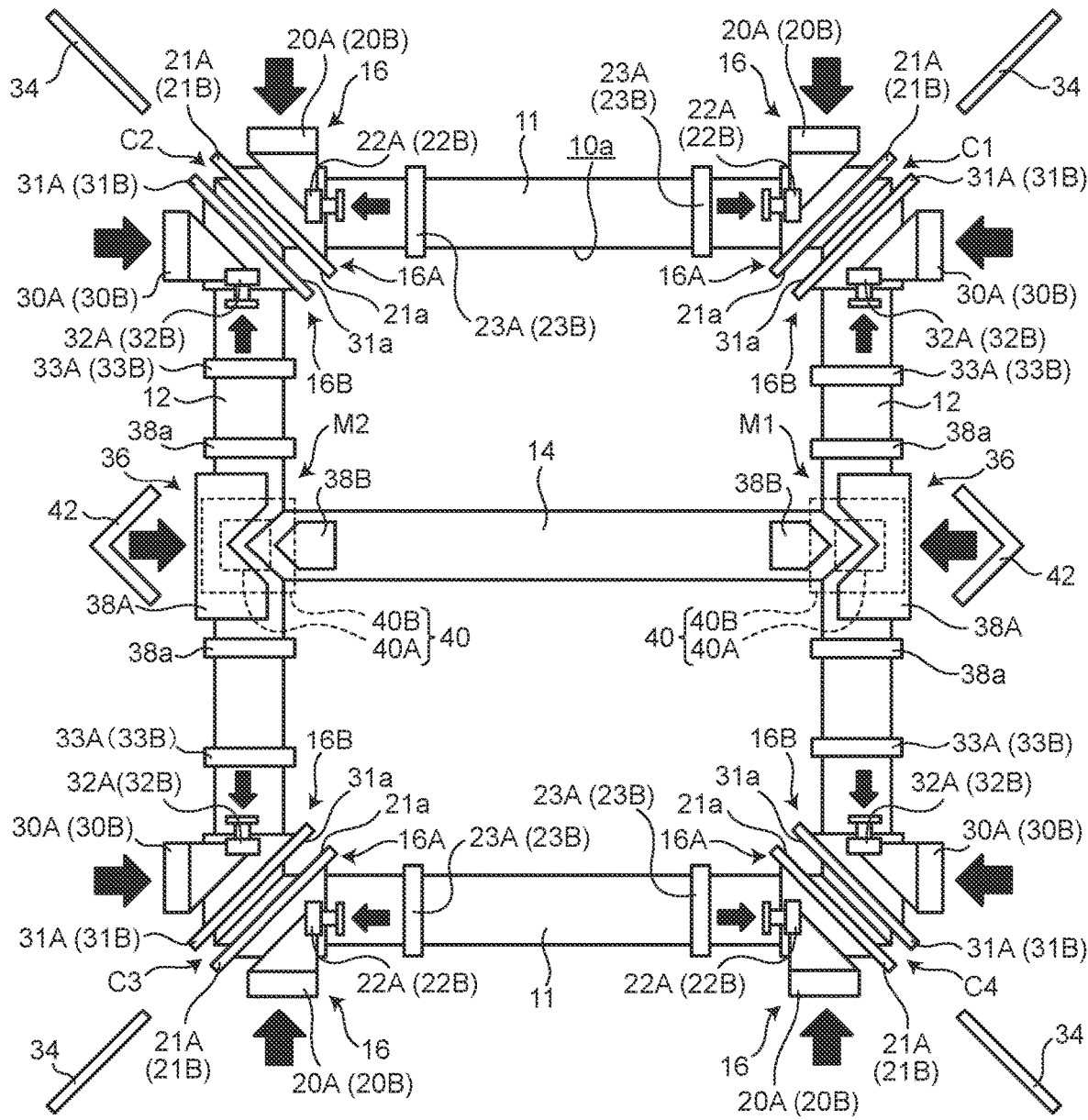
FIG. 2 is an explanatory view schematically illustrating an operation of joining the resin profiles for forming the resin frame illustrated in FIG. 1 using a resin profile joining device according to one embodiment.

As illustrated in FIG. 2, the joining method for the frames 11, 12 constituting the resin frame 10 at four corner parts C1 to C4 in this embodiment may be substantially the same except that the orientation and crimping direction of each frame 11, 12 are different, and the joining devices 16 for joining the frames 11, 12 at these corner parts C1 to C4 may also be the same. In view of this, the joining method for joining the frames 11, 12 at the upper right corner part C1 in FIG. 2, that is, a right end part 11A of the upper horizontal frame 11 and an upper end part 12A of the right vertical frame 12, and the joining device 16 for joining the frames 11, 12 at the corner part C1 are described as a representative example, and the detailed description on the joining method and the joining device for joining the frames at the other three corner parts C2 to C4 is omitted. In the joining method in this embodiment, the joining devices 16 installed at the four corner parts C1 to C4 are operated simultaneously to join the frames at the corner parts C1 to C4 simultaneously, but the frames may be joined at the corner parts C1 to C4 individually or in multiples.

Figure 3A:
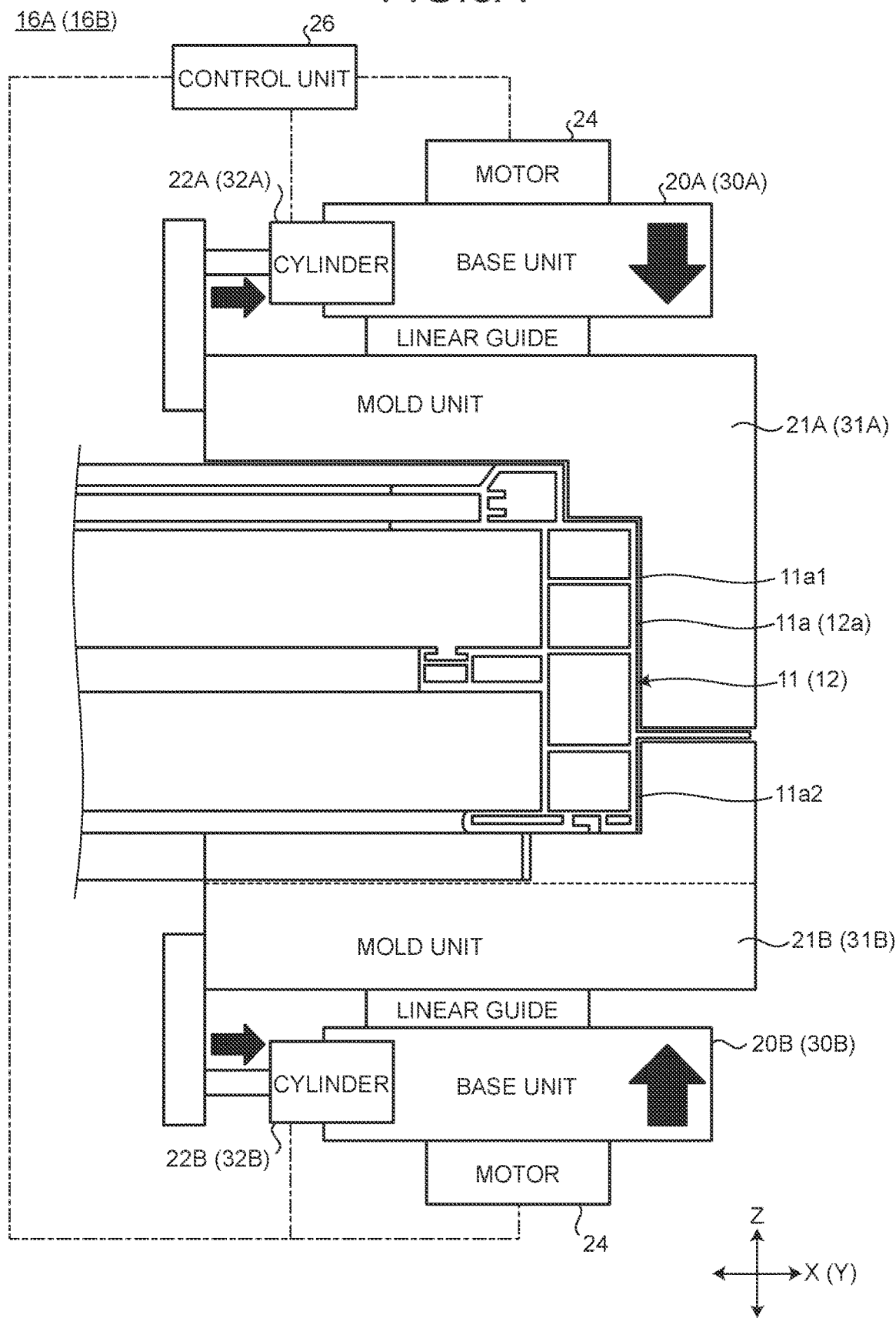
FIG. 3A is an explanatory view schematically illustrating a structure of the resin profile joining device.
Figure 3B:
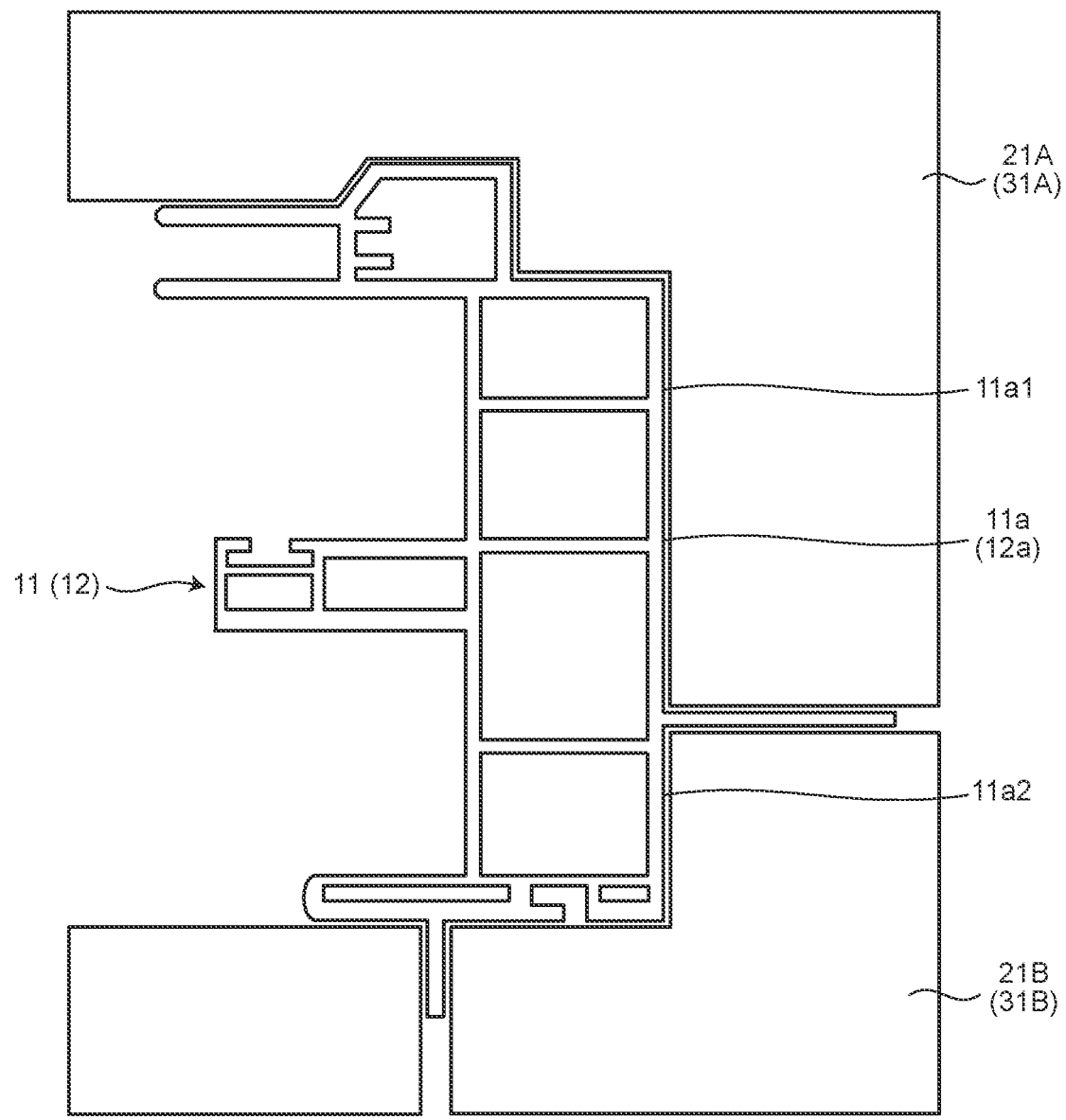
FIG. 3B is a diagram in which the resin frame and the resin profile joining device illustrated in FIG. 3A are viewed from a cross-sectional direction.

First, a configuration example of the joining device 16 is described. As illustrated in FIG. 2 and FIG. 3A, the joining device 16 includes a first unit 16A that holds and moves the horizontal frame 11, which is one resin profile, and a second unit 16B that holds and moves the vertical frame 12, which is the other resin profile. FIG. 3A and FIG. 3B schematically illustrate a configuration of the first unit 16A, while the illustration of the second unit 16B is omitted. As also illustrated in FIG. 2, the second unit 16B may have substantially the same configuration as the first unit 16A except that the second unit 16B holds and moves the vertical frame 12 instead of the horizontal frame 11. Therefore, the components and other elements of the second unit 16B are denoted with reference symbols in parentheses in FIG. 3A and FIG. 3B, and detailed descriptions and illustrations thereof are omitted.

As illustrated in FIG. 2 and FIG. 3A, the first unit 16A includes first base units 20A, 20B serving as a first base, first mold units 21A, 21B serving as a first mold, first cylinders 22A, 22B, and first clamps 23A, 23B, which are installed so as to hold the horizontal frame 11 therebetween from the Z direction. Since the first base units 20A, 20B may have substantially symmetrical structures, they may be referred to as "first base unit 20" without distinguishing both. The first mold units 21A, 21B, the first cylinders 22A, 22B, and the first clamps 23A, 23B may likewise be referred to and described as "first mold unit 21", "first cylinder 22", and "first clamp 23", respectively, and this similarly applies to each component of the second unit 16B.

The first base unit 20 is a device that clamps the horizontal frame 11 and the position of the first base unit 20 relative to the horizontal frame 11 is fixed. The first base unit 20 can be moved by a motor 24 along the Y direction, which is orthogonal to the longitudinal direction (X direction) of the horizontal frame 11. This allows the first base unit 20 to move the horizontal frame 11 in the Y direction. The motor 24 is an electric motor driven and controlled by a control unit 26 and is, for example, a servo motor.

The control unit 26 may be implemented by having a processing unit such as a central processing unit (CPU) execute a computer program, i.e., may be implemented by software, by hardware such as an integrated circuit (IC), or by a combination of software and hardware.

The first mold unit 21 is a part that holds the horizontal frame 11. The first mold unit 21 has a mold shape along a surface 11a of the horizontal frame 11 on the opposite side of the opening part 10a side (on the outside of the frame) and holds the surface 11a. The first mold unit 21 may be configured so that only a part of the first mold unit 21 that is in contact with the surface 11a is detachable, allowing for more flexible handling of the resin profiles with various cross-sectional shapes. The first mold unit 21 is movably supported in the X direction via a linear guide 28 with respect to the first base unit 20 and is not movable relatively in the Y direction. In FIG. 2, the motor 24 and the linear guide 28 are not illustrated.

As illustrated in FIG. 3A and FIG. 3B, an end surface 11Aa of the end part 11A of the horizontal frame 11 has a complex, undetermined cross-sectional shape with multiple steps and corners. For this reason, the joining device 16 in this embodiment has a configuration in which the first mold unit 21 is divided into two parts in the Z direction, with one mold unit 21A holding one portion 11a1 of the surface 11a and the other mold unit 21B holding the other portion 11a2 of the surface 11a.

In order to deal with these divided first mold units 21A, 21B, the joining device 16 also includes two divided first base units 20A, 20B and two divided first cylinders 22A, 22B. The first base unit 20, the first mold unit 21, and the first cylinder 22 may have an integral configuration instead of the two-divided configuration.

Thus, the first mold unit 21 holds the horizontal frame 11 with the mold surface that follows the surface 11a of the horizontal frame 11. Therefore, the first mold unit 21 is movable relative to the horizontal frame 11 in its longitudinal direction (X direction), while the first mold unit 21 is not movable relative to the Y direction, which is orthogonal to the X direction.

The first cylinder 22 is a slide mechanism provided between the first base unit 20 and the first mold unit 21. The first cylinder 22 supports the first mold unit 21 so that the first mold unit 21 can advance or retract relative to the first base unit 20 in the X direction. The first cylinder 22 is formed by an air cylinder, for example, and may alternatively be formed by a hydraulic cylinder, an electric motor, a spring, or the like. Thus, the first cylinder 22 allows the first mold unit 21 to advance or retract in the X direction relative to the first base unit 20, and also allows the first mold unit 21 to retract upon reception of a predetermined load or more. In other words, when the first cylinder 22 in a state of pressing the first mold unit 21 in a first direction receives the predetermined load or more, the first cylinder 22 is compressed in a second direction, which is opposite thereto, allowing the first mold unit 21 to retract in accordance with this. The first clamp 23 is a clamp device that clamps the horizontal frame 11.

As mentioned above, the second unit 16B may have a configuration that is substantially the same as that of the first unit 16A. That is to say, the second unit 16B includes second base units 30A, 30B (also referred to as "second base unit 30") serving as a second base, second mold units 31A, 31B (also referred to as "second mold unit 31") serving as a second mold, second cylinders 32A, 32B (also referred to as "second cylinder 32"), and second clamps 33A, 33B (also referred to as "second clamp 33"), which are installed to hold the vertical frame 12 therebetween from the Z direction. These second base unit 30, second mold unit 31, second cylinder 32, and second clamp 33 may have the configurations that are the same as or similar to those of the first base unit 20, the first mold unit 21, the first cylinder 22, and the first clamp 23 described above, respectively. In a manner similar to the first mold unit 21, the second mold unit 31 also has a mold surface along a surface 12a of the vertical frame 12 on the opposite side of the opening part 10a side (on the outside of the frame) and holds the surface 12a (see FIG. 3A and FIG. 3B).

Next, the joining method for the horizontal frame 11 and the vertical frame 12 is described with reference to FIG. 4. In the illustration in FIG. 4, the horizontal frame 11 and the vertical frame 12, which are joined at 90 degrees actually, are developed by 180 degrees. Each step in FIG. 4 is executed under the control of the control unit 26. As the joining method for the horizontal frame 11 and the vertical frame 12 here, the joining method for the horizontal frames 11, which constitute the upper and lower frames in FIG. 1 and FIG. 2, and the vertical frames 12 is described. However, the horizontal frames in this joining method can be rephrased as frame materials arranged along the left-right direction, and in this case, the joining method can also be used to join the horizontal frame (mullion 14) and the vertical frame 12. In a substantially similar manner, the mullion 14 may be installed vertically between the upper and lower horizontal frames 11, 11 as described above. In other words, the vertical frame in this joining method can be rephrased as a mullion standing in the up-down direction, and in this case, the joining method can be used to join the horizontal frame 11 and the vertical frame (mullion).

First, at the initial step in FIG. 4, the first mold unit 21 holds the horizontal frame 11 and the second mold unit 31 holds the vertical frame 12, with the end surface 11Aa of the horizontal frame 11 and an end surface 12Aa of the vertical frame 12 placed to face each other. In this case, the mold units 21, 31 are also positioned with their front end surfaces 21a, 31a facing each other, and the end surfaces 11Aa, 12Aa are set to protrude more than the front end surfaces 21a, 31a.

Next, a reference flat surface processing step is performed. At the reference flat surface processing step, a cutting tool such as an end mill is inserted between the end surfaces 11Aa, 12Aa, which face each other through a predetermined gap, and the end surfaces 11Aa, 12Aa are cut by a predetermined amount. Through this reference flat surface processing, the end surfaces 11Aa, 12Aa of the end parts 11A, 12A of the respective frames 11, 12 are formed to have desired flatness, and a predetermined range from the end surfaces 11Aa, 12Aa is set as a crimp allowance CA. The crimp allowance CA is the portion that is crushed to be joined when the frames 11, 12 are crimped. In other words, in the joining method, the flatness of the end surfaces 11Aa, 12Aa to be crimped is secured by performing the reference flat surface processing step, and at the same time, the crimp allowance CA can be set within the set range. Thus, the effects of improving the joining strength of the frames 11, 12 after crimping, which is described below, and suppressing burrs can be obtained.

Next, a non-contact heating step is performed. At the non-contact heating step, each end part 11A, 11B is heated without contact with a heater plate 34 disposed between the end surfaces 11Aa, 12Aa that face each other. The gap between each surface of the heater plate 34 and each end surface 11Aa, 12Aa is set at about 1 mm, for example. The heater plate 34 is maintained at a constant temperature and heated for a predetermined time, for example several seconds. Thus, in the end parts 11A, 12A of the respective frames 11, 12, at least the crimp allowance CA is melted.

Incidentally, the joining device 16 can move the mold units 21, 31 relative to the frames 11, 12 in the longitudinal direction of the corresponding frame of the frames 11, 12. Therefore, as illustrated in FIG. 4, at the non-contact heating step, the mold units 21, 31 are preferably disposed at positions of retracting from the respective end surfaces 11Aa, 12Aa of the frames 11, 12, specifically, retracting from the crimp allowance CA. Thus, taking of the heat by the mold units 21, 31 from the frames 11, 12 that have been heated without contact can be suppressed. As a result, the temperature drop of the frames 11, 12 during a crimping step to be described below can be suppressed and the joining strength is improved.

Next, after the heater plate 34, which has completed heating, is retracted from between the end surfaces 11Aa, 12Aa, an advancing step for the mold units 21, 31 is performed. At the advancing step, the cylinders 22, 32 are energized to make the mold units 21 and 31 advance along the direction in which the mold units 21, 31 are butted against each other. The mold units 21, 31 in this embodiment are arranged so as to intersect with each other by 90 degrees as illustrated in FIG. 2. Therefore, the first mold unit 21 advances in the X direction along the longitudinal direction of the horizontal frame 11, and the second mold unit 31 advances in the Y direction along the longitudinal direction of the vertical frame 12. As a result, the mold units 21, 31 have their front end surfaces 21a, 31a in contact with each other while covering between the end surfaces 11Aa, 12Aa, and cover the surfaces 11a, 12a of the frames 11, 12.

Next, the crimping step is performed. At the crimping step, while the mold units 21, 31 have their front end surfaces 21a, 31a in contact, in other words, the energizing force of the cylinders 22, 32 is kept, the base units 20, 30 are driven to crimp the end surfaces 11Aa, 12Aa by the crimp allowance CA. In the case of this embodiment, the first base unit 20 is moved to the inside of the frame in the Y direction and the second base unit 30 is moved to the inside of the frame in the X direction in order to crimp the end surfaces 11Aa, 12Aa that are inclined at 45 degrees as illustrated in FIG. 2. Thus, the end parts 11A, 12A of the frames 11, 12 are crushed and fusion-bonded together. Note that the amount of movement of the frames 11, 12 by the base units 20, 30, in other words, the amount of crimping may be controlled by the control unit 26 or physically controlled by provision of a stopper that restricts the movement of the base units 20, 30 at a predetermined position.

When the frames 11, 12 are crimped in this manner, as the frames 11, 12 move, the mold units 21, 31 also receive a load in the direction where their front end surfaces 21a, 31a are butted against each other. Here, the mold units 21, 31 are supported by the base units 20, 30 via the cylinders 22, 32 that can retract when subjected to a predetermined load or more. Therefore, when the end parts 11A, 12A are crimped, the mold units 21, 31 move relative to the frames 11, 12 in the directions opposite to the respective crimping directions while maintaining the contact between the front end surfaces 21A, 31A. In other words, the first mold unit 21 moves relative to the horizontal frame 11 in the X direction of retracting from the end surface 11Aa. The second mold unit 31 moves relative to the vertical frame 12 in the Y direction of retracting from the end surface 12Aa.

Thus, the frames 11, 12 are crimped to each other with their surfaces 11a, 12a guided by the mold units 21, 31 that remain in contact with each other. As a result, the frames 11, 12 are firmly joined with a fusion-bonded part W where the crimp allowance CA is crushed and firmed between each other's end parts 11A, 12A as illustrated in FIG. 4.

In this case, the fusion-bonded resin does not expand on the surfaces 11a, 12a, which are guided by the mold units 21, 31, and burr generation is suppressed, resulting in high appearance quality. On the other hand, the outer surfaces other than the surfaces 11a, 12a covered by the mold units 21, 31 produce burrs B where the fusion-bonded resin has expanded. However, since the outer surface where the burrs B are generated is, for example, the part that forms the prospective surface on the opening part 10a side (inside the frame) of the resin frame 10 and is the surface where the sash or glass will be placed, the burr B has little effect on the appearance quality.

As described above, the joining method in this embodiment performs the crimping step for the frames 11, 12 with the mold units 21, 31 in contact with the surfaces 11a, 12a. As a result, the burr generation on the surfaces 11a, 12a of the frames 11, 12 after fusion-bonding is suppressed, eliminating the need for manual post-processing and cleaning of cut burrs, for example, as well as the need for painting after joining. Thus, productivity is improved. In addition, since the joining method suppresses the generation of burrs on the surfaces 11a, 12a, the formation of streaky shear surfaces when the burrs are torn off with a cutter blade can be avoided, thereby improving the appearance quality.

The joining device 16 in this embodiment includes the first mold unit 21 that holds the horizontal frame 11 in a state of being able to relatively move along the longitudinal direction of the horizontal frame 11, the second mold unit 31 that holds the vertical frame 12 in a state of being able to relatively move along the longitudinal direction of the vertical frame 12, the first base unit 20 that supports the first mold unit 21 in a manner of being able to move along the longitudinal direction of the horizontal frame 11 and moves the horizontal frame 11, and the second base unit 30 that supports the second mold unit 31 in a manner of being able to move along the longitudinal direction of the vertical frame 12 and moves the vertical frame 12. Therefore, the joining device 16 can perform the crimping step for the frames 11, 12 with the mold units 21, 31 in contact with the surfaces 11a, 12a, thus improving the productivity and the appearance quality.

As described above, the joining method in this embodiment can further improve the productivity by simultaneously driving the joining devices 16 at the corner parts C1 to C4 in the arrow directions illustrated in FIG. 2, thereby joining the frames 11, 12 at the four corner parts C1 to C4 simultaneously and forming the resin frame 10 at a time.

The joining method and the joining device 16 in FIG. 4 may be used for other areas than the corner parts between the resin profiles. In this case, the first unit 16A and the second unit 16B are preferably arranged linearly with a left-right symmetrical structure, and the base units 20, 30 are preferably configured to move the resin profiles along their longitudinal directions.

Next, the joining method for the vertical frame 12 and the mullion 14 and a joining device 36 capable of performing this joining method will be described.

As illustrated in FIG. 2, the joining methods for the left and right vertical frames 12 and both end parts of the mullion 14 that form the resin frame 10 in this embodiment may be substantially the same except that the left and right structures are symmetrical, and the joining devices 36 for joining these may also be the same. In view of this, the joining method for a mullion part M1 on the right side in FIG. 2 and the joining device 36 for joining this are described as a representative example, and the detailed description on the joining method and the joining device 36 at a mullion part M2 on the left side is omitted. In the joining method in this embodiment, the joining devices 36 installed at the two mullion parts M1 and M2 are operated simultaneously to join the mullion parts M1 and M2 at the same time, but the mullion parts M1 and M2 may be joined separately.

Figure 5A:
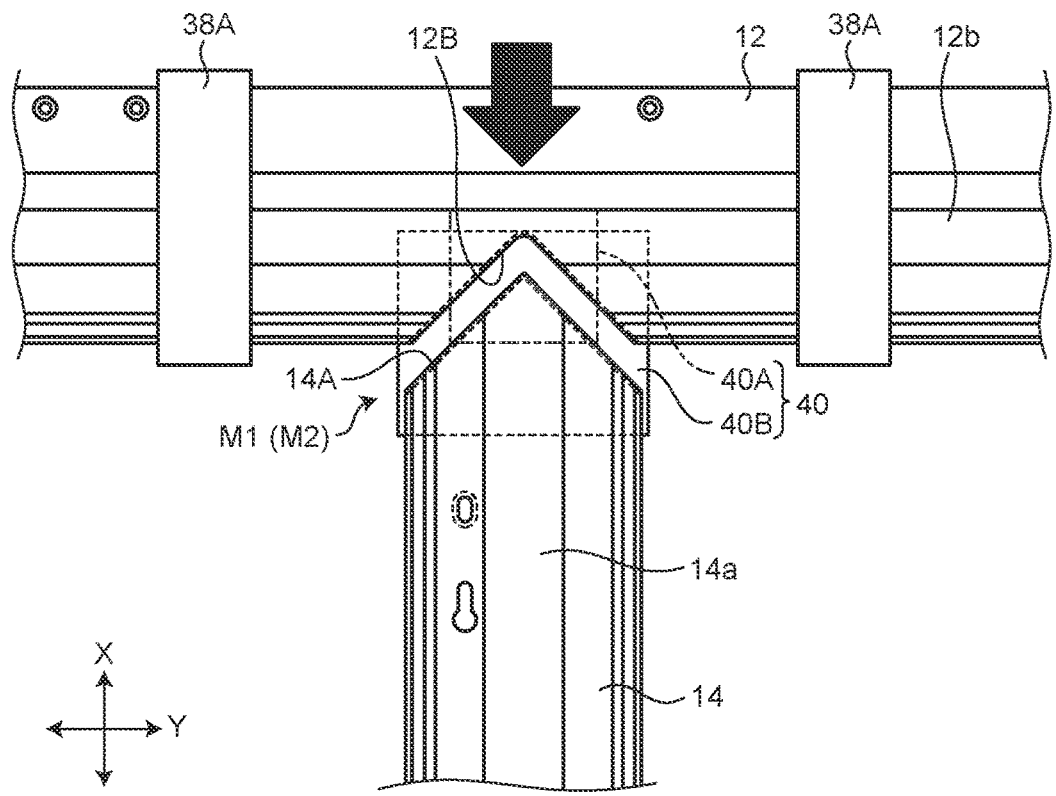
FIG. 5A is a plan view schematically illustrating a joining operation for the resin profiles at a mullion part of the resin frame illustrated in FIG. 2.
Figure 5B:
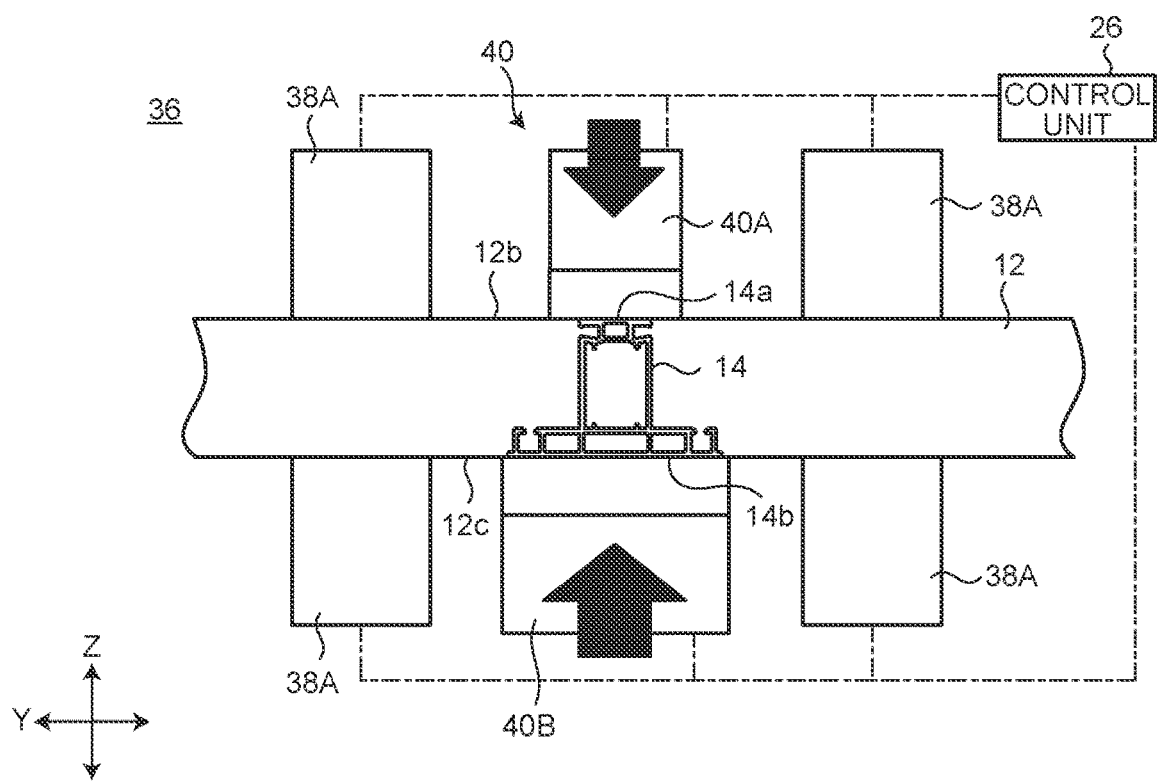
FIG. 5B is a longitudinal cross-sectional view schematically illustrating a joining operation for the resin profiles illustrated in FIG. 5A.

First, a configuration example of the joining device 36 is described. As illustrated in FIG. 2, FIG. 5A, and FIG. 5B, the joining device 36 includes a first clamp device 38A that holds and moves the vertical frame 12, which is one resin profile of a pair of resin profiles, a second clamp device 38B that holds and moves the mullion 14, which is the other resin profile of the pair of resin profiles, and a guide device 40. The first clamp device 38A and the second clamp device 38B serve as a first clamp and a second clamp, respectively. In FIG. 5A and FIG. 5B, the illustration of the second clamp device 38B is omitted.

The first clamp device 38A has a configuration in which one set of clamp groups have the mullion 14 held therebetween in the Y direction, each clamp group being a pair of clamps 38a that are arranged to face each other in the Z direction and hold the vertical frame 12 therebetween. The first clamp device 38A can be moved along the X direction by a motor similar to the motor 24 with respect to a predetermined base platform.

The second clamp device 38B includes a pair of clamps that are disposed to face each other in the Z direction and have the mullion 14 held therebetween. The position of the second clamp device 38B is fixed. However, the first clamp device 38A may be fixed, and in this case, the second clamp device 38B may be configured to be movable along the X direction by a motor relative to a predetermined base platform.

The guide device 40 includes a pair of guide members 40A, 40B that can be moved in the Z direction so as to hold a joint part between the pair of guide members 40A, 40B, the joint part being formed between the vertical frame 12 and the mullion 14. The pair of guide members 40A, 40B serve as a pair of guide.

One guide member 40A of the pair of guide members 40A, 40B is in contact with surfaces 12b, 14a of the vertical frame 12 and the mullion 14 on one side in the Z direction (for example, the indoor side) so as to be stamped thereon. The other guide member 40B of the pair of guide members 40A, 40B is in contact with surfaces 12c, 14b of the vertical frame 12 and the mullion 14 on the other side in the Z direction (for example, the outdoor side) so as to be stamped thereon. In the case of this embodiment, the surfaces 12b, 12c, 14a, 14b are flat (see FIG. 5B), and the contact surfaces of the guide members 40A, 40B may also be flat. The guide members 40A, 40B may be formed of engineering plastics, such as polyimide-based Vespel (registered trademark) or polyetheretherketone (PEEK), which are hard resins with high insulation performance. The guide members 40A, 40B may be made of metal.

The operation of the joining device 36 is controlled by the control unit 26, which is commonly used by the joining device 16 described above (see FIG. 5B). The control unit of the joining device 36 may be provided separately from the control unit 26.

A first procedure of the joining method for the horizontal frame 11 and the vertical frame 12 is described next with reference to FIG. 6. Each step in FIG. 6 is performed under the control of the control unit 26, and the same applies to the steps in FIG. 7 and FIG. 8.

First, an initial step similar to the initial step illustrated in FIG. 4 is performed. At this initial step, the first clamp device 38A holds the vertical frame 12, the second clamp device 38B holds the mullion 14, and the concave part 12B and the end part 14A are disposed to face each other. At this time, the guide members 40A, 40B are disposed at positions of retracting from the surfaces 12b, 14a and the surfaces 12c, 14b, respectively.

Next, a reference flat surface processing step similar to the reference flat surface processing step in FIG. 4 is performed. At this reference flat surface processing step, a cutting tool such as an end mill is inserted between the concave part 12B and the end part 14A, and the respective end surfaces are cut by a predetermined amount. Although the illustration is omitted, at the reference flat surface processing step in this case, the end surface of the concave part 12B and the end surface of the end part 14A are formed to have predetermined flatness, and a predetermined range from each end surface is set as the crimp allowance.

As illustrated in FIG. 6, a non-contact heating step is performed next. At the non-contact heating step, the concave part 12B and the end part 14A, which face each other, are heated without contact with a heater plate 42 disposed between the concave part 12B and the end part 14A. The heater plate 42 is, for example, a substantially V-shaped plate that follows the end surface shape of the concave part 12B and the end part 14A. The gap between each surface of the heater plate 42 and the end surfaces of the concave part 12B and the end part 14A is set at about 1 mm, for example. The heater plate 42 is maintained at a constant temperature and heated for a predetermined time, for example several seconds. Thus, in the vertical frame 12 and the mullion 14, at least the crimp allowance is melted.

Next, after the heater plate 42, which has completed heating, is retracted from between the concave part 12B and the end part 14A, a guide contact step is performed. At the guide contact step, the guide member 40A is brought into contact with the surfaces 12b, 14a while covering between the end surface of the concave part 12B and the end surface of the end part 14A, and at the same time the guide member 40B is brought into contact with the surfaces 12c, 14b while covering between the end surface of the concave part 12B and the end surface of the end part 14A. In other words, the guide members 40A, 40B are in contact with the respective surfaces 12b, 14a, 12c, 14b of the vertical frame 12 and the mullion 14 so as to be stamped thereon.

Next, the crimping step is performed. At the crimping step, with the guide members 40A, 40B kept in contact with the surfaces 12b, 14a, 12c, 14b, the clamp device 38A is driven to crimp the concave part 12B and the end part 14A by the crimp allowance. Accordingly, the concave part 12B of the vertical frame 12 and the end part 14A of the mullion 14 are crushed and fusion-bonded to each other.

As a result, the vertical frame 12 and the mullion 14 are firmly joined with the fusion-bonded part W where the crimp allowances thereof are crushed and firmed as illustrated in FIG. 6. In this case, the surfaces 12b, 14a, 12c, 14b of the vertical frame 12 and the mullion 14 are crimped with these surfaces guided by the guide members 40A, 40B, so that the fusion-bonded resin does not expand and burr generation is suppressed, resulting in the high appearance quality. On the other hand, the back surfaces of the surfaces 12b, 14a, 12c, 14b that are not covered by the guide members 40A, 40B produce burrs B where the fusion-bonded resin has expanded. However, since the back surface with the burrs B is inside the profile and not visible from the outside, the burr B has little effect on the appearance quality.

Incidentally, in the joining method according to the first procedure in FIG. 6, the guide members 40A, 40B are in contact with the vertical frame 12 and the mullion 14 that are heated without contact before the crimping step. Therefore, in the first procedure, the heat of the vertical frame 12 and the mullion 14 that are heated may be taken by the guide members 40A, 40B, and the temperature of the vertical frame 12 and the mullion 14 may decrease at the crimping step. In this regard, the guide members 40A, 40B in this embodiment are formed of resin with high thermal insulation performance as described above. Although the first procedure can also minimize the temperature drop of the vertical frame 12 and the mullion 14, the following second procedure can suppress the temperature drop further.

Next, the second procedure of the joining method for the horizontal frame 11 and the vertical frame 12 is described with reference to FIG. 7.

Figure 7:
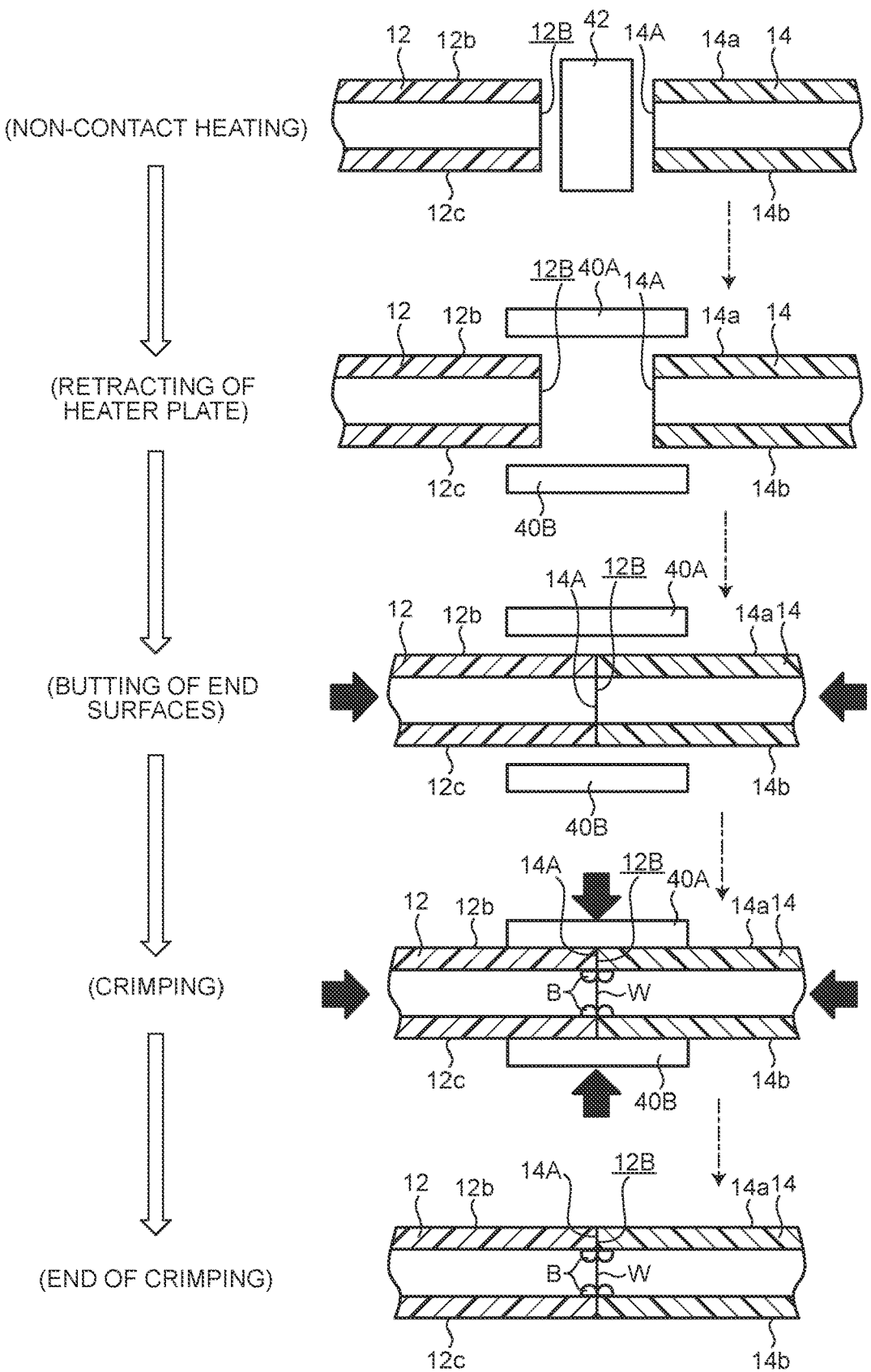
FIG. 7 is an operation view illustrating a second procedure of the resin profile joining method at the mullion part of the resin frame illustrated in FIG. 2.

In the second procedure illustrated in FIG. 7, the initial step, the reference flat surface processing, the non-contact heating step, and the retraction step for the heater plate 42 may be similar to those in the first procedure in FIG. 6; thus, detailed description thereof is omitted.

As illustrated in FIG. 7, the non-contact heating of the vertical frame 12 and the mullion 14 is followed by an end surface butting step in the second procedure. At the end surface butting step, the clamp device 38A is driven to move the vertical frame 12 with the guide members 40A, 40B retracted such that the end surface of the concave part 12B and the end surface of the end part 14A are butted against each other, and the movement of the vertical frame 12 is stopped when the end surface of the concave part 12B and the end surface of the end part 14A are butted against each other. In this case, the vertical frame 12 and the mullion 14 are not crimped, and the drive of the clamp device 38A is stopped immediately after the end surfaces of the two are in contact with each other.

Next, the crimping step is performed. At the crimping step, the guide members 40A, 40B are brought into contact with the surfaces 12b, 14a, 12c, 14b so as to cover between the end surface of the concave part 12B and the end surface of the end part 14A, and at the same time or with a little delay, the clamp device 38A is driven to crimp the concave part 12B and the end part 14A by the crimp allowance. In other words, the crimping step in the second procedure can be rephrased as simultaneously executing the guide contact step and the crimping step in the first procedure described above.

As a result, the vertical frame 12 and the mullion 14 are firmly joined with the fusion-bonded part W where the crimp allowances thereof are crushed and firmed as illustrated in FIG. 7. In this case, since the vertical frame 12 and the mullion 14 are crimped with the surfaces 12b, 14a, 12c, 14b guided by the guide members 40A, 40B, the fusion-bonded resin does not expand as in the first procedure described above, and the burr generation is suppressed, resulting in the high appearance quality.

Moreover, in the second procedure, the guide members 40A, 40B are brought into contact with the vertical frame 12 and the mullion 14 at substantially the same time as the crimping operation at the crimping step. Therefore, the second procedure can suppress more reliably taking, by the guide members 40A, 40B, of the heat from the heated vertical frame 12 and mullion 14 to cause the temperature drop of the vertical frame 12 and the mullion 14 during the crimping step, and accordingly the joining strength between the vertical frame 12 and the mullion 14 is further improved. The first procedure in FIG. 6 has the advantage that control by the control unit 26 is simplified because the end surface butting step in FIG. 7 is unnecessary.

Even with this second procedure, some temperature drop is inevitable because the guide members 40A, 40B are in contact with the vertical frame 12 and the mullion 14 at crimping.

In view of this, a third procedure of the joining method for the horizontal frame 11 and the vertical frame 12 is described next with reference to FIG. 8. This third procedure can further suppress the temperature drop of the vertical frame 12 and the mullion 14 at crimping compared to the first and second procedures described above.

In the third procedure in FIG. 8, the initial step, the reference flat surface processing step, the non-contact heating step, the retraction step for the heater plate 42, and the end surface butting step may also be similar to those in the second procedure in FIG. 7; thus, detailed description thereof is omitted. Differently from the end surface butting step in the second procedure, the end surface butting step in the third procedure does not require stopping the clamp device 38A after butting the end surface of the concave part 12B and the end surface of the end part 14A. In other words, in the third procedure, the end surface butting step substantially constitutes a part of the crimping step and therefore, may be omitted.

As illustrated in FIG. 8, the third procedure performs the crimping step with the guide members 40A, 40B retracted after the non-contact heating step and the end surface butting step. At this crimping step, the clamp device 38A is driven with the guide members 40A, 40B not in contact with the surfaces 12b, 14a, 12c, 14b to crimp the concave part 12B and the end part 14A by the crimp allowance. Accordingly, the concave part 12B and the end part 14A of the vertical frame 12 and the mullion 14 are crushed and fusion-bonded to each other and joined together firmly. However, in this case, the burrs B1, B2 are generated on the back surface of the vertical frame 12 and the mullion 14, in addition to the burrs B on the surfaces 12b, 14a, 12c, 14b.

In view of this, a guide contact step to crush these burrs B1, B2 is performed next. This guide contact step is not to prevent the burr generation but rather to crush the burrs B1, B2 that have been formed. In other words, this guide contact step is performed immediately after the crimping step while the burrs B1, B2 are still in a softened state. The guide member 40A is in contact with the surfaces 12b, 14a from above the burr B1 to crush the burr B1; at the same time, the guide member 40B is in contact with the surfaces 12c, 14b from above the burr B2 to crush the burr B2. Therefore, the guide members 40A, 40B in this case may be in contact with the surfaces 12b, 14a, 12c, 14b with a load of 50 to 150 N, which is similar to that at the guide contact step described above, but is preferably strongly with a load of 100 N or more.

As a result, as illustrated in FIG. 8, the burrs B1, B2 are crushed by the guide members 40A, 40B, resulting in the high appearance quality of the vertical frame 12 and the mullion 14. Thus, in the third procedure, the temperature drop of the vertical frame 12 and the mullion 14 at crimping can be further suppressed to further improve the joining strength. However, in this third procedure, the burrs B1, B2 once formed on the surfaces 12b, 14a, 12c, 14b are later crushed, which may cause the surfaces 12b, 14a, 12c, 14b to shine. On the other hand, it can be said that the first and second procedures described above are superior to the third procedure in that they do not cause deterioration in appearance quality resulting from such shiny appearance.

As described above, by using the guide members 40A, 40B, the joining method in this embodiment can prevent the generation of burrs, or can erase the burrs that have occurred during fusion-bonding of the vertical frame 12 and the mullion 14. Therefore, the burr generation on the surfaces 12b, 14a, 12c, 14b of the vertical frame 12 and the mullion 14 after fusion-bonding is suppressed, eliminating the need for manual post-processing and cleaning of cut burrs, for example, thereby improving the productivity. In addition, this joining method improves the appearance quality because the burr generation itself on the surfaces 12b, 14a, 12c, 14b is suppressed or tearing off the generated burrs B1, B2 with a cutter blade is unnecessary. Furthermore, the first and second procedures in FIG. 6 and FIG. 7 do not result in a shiny appearance or the like of the surfaces 12b, 14a, 12c, 14b, and do not require painting after joining.

Only one of the guide members 40A, 40B may be used, in which case the other may serve as a receiving member that does not advance or retract. By having the resin profile sandwiched in contact between the pair of guide members 40A, 40B, the contact of the guide members 40A, 40B with the resin profile can be stabilized and the range in which the burr generation can be suppressed can be expanded.

This joining method for the vertical frame 12 and the mullion 14 may be performed at the same time as the joining method for the frames 11, 12 described above. In this case, the resin frame 10 with the frames 11, 12, and the mullion 14 joined together can be formed at a time, further improving the productivity. Needless to say, the joining method for the vertical frame 12 and the mullion 14 may be performed separately from the joining method for the frames 11, 12 described above.

The joining method and the joining device 36 in FIG. 6 to FIG. 8 may be used for other than the mullion parts M1, M2, for example the corner parts C1 to C4 or the part of joining the resin profiles in a direction of 180 degrees. However, due to the configuration in which the guide members 40A, 40B are in contact with the surface of the resin profile so as to be stamped thereon, it is preferable that the surface to be in contact be flat, such as the surfaces 12b, 14a described above. In other words, it can be said that the joining method and the joining device 16 in FIG. 4 are particularly effective for the surfaces 11a, 12a with the complex shape, while the joining method and the joining device 36 in FIG. 6 to FIG. 8 are particularly effective for the surfaces 12b, 14a, etc. with the flat shape.

In the joining method and the joining devices 16, 36 in FIG. 4 and FIG. 6 to FIG. 8, the crimp allowance, the heater temperature, the distance of each gap, the heating time, and the like can be changed as needed depending on the material, shape, size, application, ambient temperature, etc. of the resin profile to be joined, and are not limited by the conditions in the above example.

A resin profile joining method according to a first aspect of the disclosure is a method of joining a pair of resin profiles by melting and crimping the pair of resin profiles, and includes: holding one resin profile and another resin profile of the pair of resin profiles with a first mold and a second mold, respectively, such that end surfaces of the pair of resin profiles are faced each other; heating the end surfaces of the pair of resin profiles in no contact with the end surfaces of the pair of resin profiles to melt the pair of resin profiles; after the heating, moving each of the first mold and the second mold relative to the pair of resin profiles in a longitudinal direction of a corresponding resin profile of the pair of resin profiles, thereby making the first mold and the second mold in contact with each other while covering between the end surfaces of the pair of resin profiles; and crimping the end surfaces of the pair of resin profiles to each other while keeping the first mold and the second mold in contact with the surfaces of the pair of resin profiles, thereby joining the pair of resin profiles. This method improves the productivity and the appearance quality because the mold can suppress the burr generation on the surfaces of the resin profiles during the crimping.

When the end surfaces of the pair of resin profiles are crimped to each other at the crimping, the first mold may be moved relative to the one resin profile in a direction opposite to a crimping direction for the one resin profile while the first mold remains in contact with the second mold, and simultaneously, the second mold may be moved relative to the other resin profile in a direction opposite to a crimping direction for the other resin profile while the second mold remains in contact with the first mold. In this case, the first and second molds, which remain in contact with each other, will not collide with each other during the crimping and the movement of the resin profiles will not be interrupted, allowing the crimping to be executed smoothly.

At the crimping, an end part of each of the pair of resin profiles in a range set from each end surface of the resin profiles is crimped as a crimp allowance, and at the heating, the first mold may be disposed at a position backward from the crimp allowance of the one resin profile, and the second mold may be disposed at a position backward from the crimp allowance of the other resin profile. In this case, taking, by the first and second molds near the end surface of the resin profile to be heated, of the heat from the resin profile can be suppressed and the temperature drop of the resin profile during the crimping can be suppressed.

Furthermore, performing reference flat surface processing of cutting each end surface of the pair of resin profiles may be further provided after the holding and before the heating. In this case, the flatness of the end surface to be crimped is ensured, and at the same time, the crimp allowance can be set within a set range. Accordingly, the effects of improving the joining strength and suppressing the burr are obtained.

Each end surface of the pair of resin profiles may be inclined with respect to the longitudinal direction of the corresponding resin profile of the pair of resin profiles, and at the crimping, the end surfaces of the pair of resin profiles may be crimped to each other by moving each of the pair of resin profiles in a direction orthogonal to the longitudinal direction of the corresponding resin profile of the pair of resin profiles. In this case, the resin profiles that form the corner part of the resin frame can be smoothly joined together.

The one resin profile may form one of a pair of upper and lower horizontal frames of a resin frame of a fitting, the other resin profile may form of a pair of left and right vertical frames of the resin frame of the fitting, and the holding, the heating, the moving, and the crimping may be performed on four resin profiles simultaneously to form the resin frame. In this case, the resin frame can be formed at a time, further improving the productivity.

A resin profile joining device according to a second aspect of the disclosure is a device of joining a pair of resin profiles by melting and crimping the pair of resin profiles and includes: a first mold configured to hold one resin profile of the pair of resin profiles in a state of being able to relatively move along a longitudinal direction of the one resin profile; a second mold configured to hold another resin profile of the pair of resin profiles in a state of being able to relatively move along a longitudinal direction of the other resin profile; a first base configured to support the first mold in a manner of being able to move along the longitudinal direction of the one resin profile and move the one resin profile in a state where a position of first base relative to the one resin profile is fixed; and a second base configured to support the second mold in a manner of being able to move along the longitudinal direction of the other resin profile and move the other resin profile in a state where a position of the second base relative to the other resin profile is fixed. According to this configuration, the crimping step can be performed with the first and second molds in contact with the surfaces of the resin profiles, thereby improving the productivity and the appearance quality.

The first base may be configured to support the first mold using a first slide mechanism configured to retract upon reception of a predetermined load or more, and the second base may be configured to support the second mold using a second slide mechanism configured to retract upon reception of a predetermined load or more. In this case, the first and second molds, which are in contact with each other beforehand, do not collide with each other or interrupt the movement of the resin profiles when crimping the resin profiles together, thus facilitating the crimping of the resin profiles.

In addition, a heater plate may be disposed between end surfaces of the pair of resin profiles held by the first mold and the second mold, the heater plate being in no contact with the end surfaces of the pair of resin profiles. In this case, the resin profiles can be heated smoothly without contact.

Each end surface of the pair of resin profiles may be inclined with respect to a longitudinal direction of a corresponding resin profile of the pair of resin profiles, and the first base and the second base may be configured to move the corresponding resin profile of the pair of resin profiles in a directions orthogonal to the longitudinal direction of the corresponding resin profile of the pair of resin profiles so as to be able to crimp the end surfaces of the pair of resin profiles to each other. In this case, the resin profiles that form the corner part of the resin frame can be smoothly joined together.

The one resin profile may form one of a pair of upper and lower horizontal frames of a resin frame of a fitting, the other resin profile may form one of a pair of left and right vertical frames of the resin frame of the fitting, and a combination of the first and second molds and the first and second bases may be disposed for each of corner parts of the resin frame to be formed. In this case, the resin frame can be formed at a time, further improving the productivity.

The disclosure is not limited to the embodiments described above, and may be freely modified in the range not departing from the concept of the present invention.

According to the above-mentioned aspects of the disclosure, the productivity and the appearance quality can be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A resin profile joining method of joining a pair of resin profiles, the method comprising:
    holding one resin profile and another resin profile of the pair of resin profiles with a first mold and a second mold, respectively, such that end surfaces of the pair of resin profiles are faced each other;
    heating the end surfaces of the pair of resin profiles in no contact with the end surfaces of the pair of resin profiles to melt the pair of resin profiles;
    after the heating, moving each of the first mold and the second mold relative to the pair of resin profiles in a longitudinal direction of a corresponding resin profile of the pair of resin profiles while making the first mold and the second mold in contact with the one resin profile and the other resin profile of the pair of resin profiles, respectively, thereby making the first mold and the second mold in contact with each other while covering between the end surfaces of the pair of resin profiles; and
    crimping the end surfaces of the pair of resin profiles to each other while maintaining the first mold and the second mold in contact with the one resin profile and the other resin profile of the pair of resin profiles, respectively, thereby joining the pair of resin profiles.

2. The resin profile joining method according to claim 1, wherein
    each end surface of the pair of resin profiles is inclined with respect to the longitudinal direction of the corresponding resin profile of the pair of resin profiles, and
    at the crimping, the end surfaces of the pair of resin profiles are crimped to each other by moving each of the pair of resin profiles in a direction orthogonal to the longitudinal direction of the corresponding resin profile of the pair of resin profiles.

3. The resin profile joining method according to claim 2, wherein
    the one resin profile forms one of a pair of upper and lower horizontal frames of a resin frame of a fitting,
    the other resin profile forms one of a pair of left and right vertical frames of the resin frame of the fitting, and
    the holding, the heating, the moving, and the crimping are performed on four resin profiles simultaneously to form the resin frame.

4. The resin profile joining method according to claim 1, wherein when the end surfaces of the pair of resin profiles are crimped to each other at the crimping, the first mold is moved relative to the one resin profile in a direction opposite to a crimping direction for the one resin profile while the first mold remains in contact with the second mold, and simultaneously, the second mold is moved relative to the other resin profile in a direction opposite to a crimping direction for the other resin profile while the second mold remains in contact with the first mold.

5. The resin profile joining method according to claim 1, wherein
    at the crimping, an end part of each of the pair of resin profiles in a range set from each end surface of the resin profiles is crimped as a crimp allowance, and
    at the heating, the first mold is disposed at a position backward from the crimp allowance of the one resin profile, and the second mold is disposed at a position backward from the crimp allowance of the other resin profile.

6. The resin profile joining method according to claim 1, further comprising performing reference flat surface processing of cutting each end surface of the pair of resin profiles after the holding and before the heating.

* * * * *